United States Patent [19]

Anderson et al.

[11] 4,091,667
[45] May 30, 1978

[54] COMBINATION TEMPERATURE, WIND AND CHILL FACTOR INSTRUMENT

[76] Inventors: Gordon K. Anderson, 14632 Pacific St.; Steven M. Leuck, 14801 Briarcliff Pl., both of Tustin, Calif. 92680

[21] Appl. No.: 828,528

[22] Filed: Aug. 29, 1977

[51] Int. Cl.² ............................................. G01W 1/06
[52] U.S. Cl. .............................. 73/170 R; 73/339 C; 73/344
[58] Field of Search .................. 73/170 R, 339 C, 344

[56] References Cited

U.S. PATENT DOCUMENTS

| 3,753,371 | 8/1973 | Anderson | 73/170 R |
| 3,954,007 | 5/1976 | Harrigan | 73/339 C |
| 4,047,431 | 9/1977 | Mulvaney | 73/170 R |

*Primary Examiner*—Donald O. Woodiel

[57] ABSTRACT

An integral hand held measuring device for indicating air temperature, wind velocity and a method of determining wind chill factor having the temperature indicated by a glass bulb thermometer, the air speed by a swinging pendulum indicator and the chill factor ascertained by printed matter affixed therefore to the body of the invention, the body of which encloses and protects the instrument and is composed of a metallic or non-metallic structure of convenient size to be transported and carried by the user.

2 Claims, 5 Drawing Figures

COMBINATION TEMPERATURE, WIND AND CHILL FACTOR INSTRUMENT

This invention relates to the indication and measurement of the ambient temperature and wind velocity along with a method of easily determining the wind chill factor more particularly to a combined instrument embodying all of the said functions in a single unit.

Indication of temperature is readily achieved through a number of common well know state-of-the-art devices such as a glass bulb, bi-metal, vapor tension thermometer, pyrometer, and the like, however, wind velocity is not that easily obtained as prior art requires a scientific type instrument such as an aneometer, velometer, flow meter, etc., which in most cases, are not commonly found in general public use and may be large, bulky, costly and sometimes require further calculation to reduce indicated data to common terms of wind speed.

Further the so-called "wind chill factor" is determined by utilizing a combination of the actual dry bulb air temperature and the wind speed which is an indication of the heat removal effect of the wind to a mass at a given temperature with its equivalent or so-called effective temperature in still air. This charted data was developed by scientists and appeared in printed publication over three decades ago and is in common usage today.

Previously as noted two separate instruments and a chart were required to obtain the desired temperature. This information is important especially in adverse weather conditions and with some winter sports where these factors may have a deleterious effect on the human body.

With the foregoing in mind it becomes the primary object of the invention to provide an instrument that will at one time indicate the prevailing ambient temperature, wind velocity and chill factor.

An important object is the usage of an accurate glass bulb liquid filled thermometer of the type in ordinary use, embodied in the invention with graduated means, to determine accurately indicated conditions.

A more specific object is the utilization of a simple free swinging pendulum effected by air velocity to indicate visually the actual wind speed. While the use of a pendulum is an age old principle the application of ulilizing this device as effected by a compressible fluid passing over the surface causing the bob end to move in a predetermined manner is indeed unique and novel.

A still further object of the invention is the provision of an instrument, of the nature referred to, which can be readily and quickly read and calculated at a single glance.

Another object of the invention provided simple two-piece construction of a metalic or non-metalic structure, with the attachment thereof provided by conventional threaded or upset fasteners. The structure or body also provides a light weight rugged enclosure to protect the fragile components and moving parts from damage and rough treatment.

Yet another object provides an instrument of a size and weight to be easily and conveniently carried in the users pocket or bag.

These and other objects and advantages of the present invention will become apparent from the subsequent detailed description and the appended claims taken in conjunction with the accompanying drawings in which:

Figure 1:
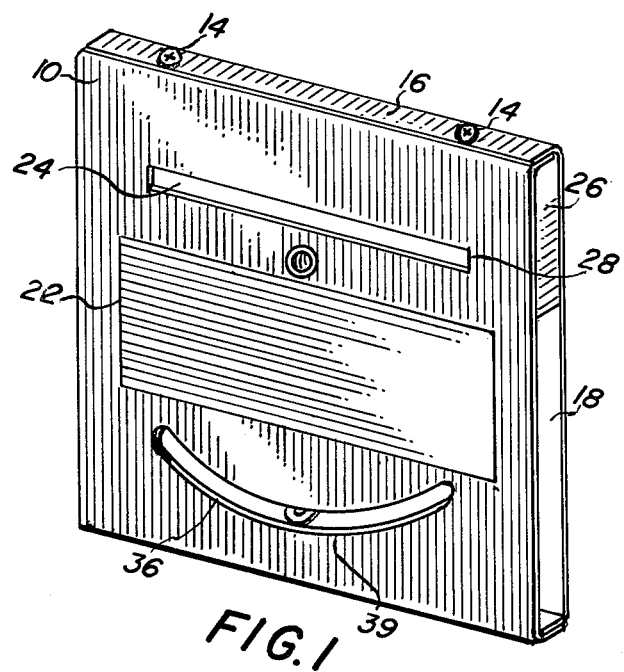
FIG. 1 is a front view of the present invention in a partial perspective.
Figure 2:
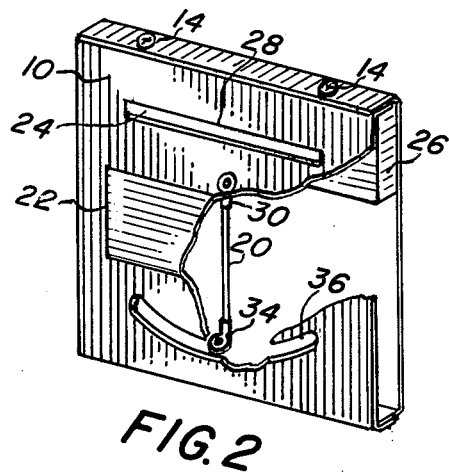
FIG. 2 is a cut away view in partial perspective of the invention showing in detail the pendulum indicator.
Figure 3:
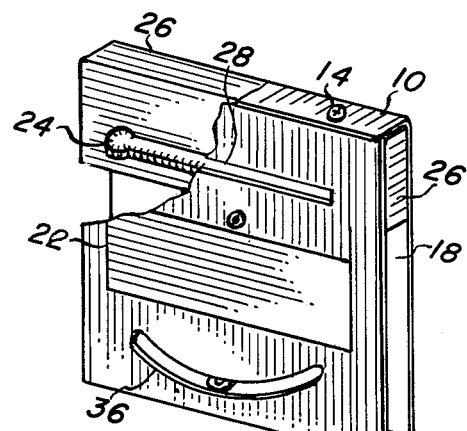
FIG. 3 is a cut away view in partial perspective of the mounting arrangement of the temperature indicating device.

Referring now, in detail, to the drawings and describing the preferred embodiment of the invention which consists of a body part 10 preferably in two similar and joining pieces of a metalic or non-metalic material fabricated by forming, casting, stamping and the like with the right angle mating surfaces 16 so positioned as to be fastened together forming structural ends to the body. The attachment thereof consists of openings of sufficient size to accept fastening means 14 such as conventional sheet metal screws, rivets, threaded fasteners, etc. The body configuration incorporates enclosed ends 16 to protect the instrumentation and open sides 18 to allow the airflow to pass unrestricted across the pendulum 20. The body also provides a suitable surface to affix the wind chill factor indication 22 either integral with the structure as raised or recessed characters or printed on the surface in opposed color or texture. The obverse side may contain other pertinent or relevant data displayed in like manner.

Figure 4:
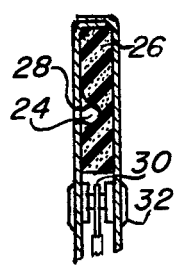
FIG. 4 shows a sectional view taken at the vertical centerline of the invention depicting the mounting arrangement of the temperature indicating device.
Figure 5:
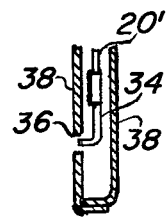
FIG. 5 depicts a sectional view also taken at the vertical centerline showing the apperature for the pendulum indicating bob.

The temperature indicating instrumentation consists of liquid expansion thermometer preferably a glass bulb type 24 mounted with the indicating side directly against the body opening and in intimate contact with a compressable resilient material 26, best depicted in FIG. 4, providing a surface surrounding the instruments on all sides allowing continuous pressure to hold the instrument in place and absorb shock loads from external origins. The resilient material 26 is preferably a closed cell synthetic sponge or the like with perhaps pressure sensitive adhesive on one side to bond the instrument 24 to the body 10. Further the shank of the thermometer 24 being located under the external surface of the body provides additional mechanical protection on the exposed side yet allows visual indication through the mating opening 28. The calibration graduation for the thermometer 24 is indicated in like manner as the wind chill factor information 22 being located in close proximity to the opening in the body 28 allowing a quick and easily read indication of temperature at the head of the column of expandable liquid in the thermometer.

The air flow indication utilizes a free swinging pendulum 20, enclosed within the confines of the body 10 limiting its movement to a radial direction parallel with the body. The pendulum 20 consists of an attaching bearing surface 30 with a thin metalic edge, to reduce friction, attached to a bob 34 with a right angle apperature or indication together with a connecting link 20' of rigid or semi-rigid material. The entire pendulum 20 attaches to a cylindrical insert 32 that is flanged at both ends and allows the pendulum to swing freely with only the mechanical resistance of the thin edge bearing surface 30 to the insert 32. The free movement of the pendulum 20 is therefore dependant upon the wind or air movement to impinge directly upon the unobstructed pendulum 20 moving within an arc shaped opening 36 in the body of the invention. This opening 36 limits the arc movement of the pendulum 20 at either end and the edges 38 further contain the bob within the enclosure 10. Air flow tests indicate the pendulum 20 is responsive to air movement and repeatable, within limitations, so as to calibrate a scale 39 orienting the movement of the pendulum to air speed allowing visual indication. The scale is affixed to, or permanently marked with raised or recessed characters or opposed in color on the body surface 10. The pendulum operates in opposition to the resistance of the fluid flow to gravity within an arc therefore in this preferred embodiment the instrument is positioned horizontally with the pendulum vertical and hand held in the air stream with the edges unobstructed.

The wind chill factor indication 22 consists of a visual chart utilizing input of air speed and temperature with the corresponding chill factor or dry bulb equivalent temperature depicted in a matrix with the input ordinates on the left side and the top. The chart is affixed to the body in like manner as the said air flow indication.

In view of the foregoing description it is believed that a clear understanding of the invention will be quite apparent to those skilled in the art. While the invention has been described in complete detail and pictorially shown in the accompanying drawing it is not to be limited to such details since changes and modifications may be in the invention without departing from the spirit and scope thereof. Hence it is described to cover any and all modifications and forms which may come within the language and scope of the appended claims:

We claim:

1. An instrument for measuring simultaneously the ambient air temperature, air velocity and assertaining the wind chill factor comprising; a structural body containing a temperature measuring device having a resiliant element to captivate and enclose said device with a visual indicating portion in intimate contact with the structure and a calibrated scale located in close proximity on the external surface of the body, also a pendulum indicator so positioned as to move freely in an arc as acted upon by wind velocity impinging on a pendulum bob and connectling link, enclosed within said body limiting lateral movement, with a corresponding calibrated scale integral with the body, together with visual indication of the temperature-wind speed relationship so as to interpret the so-called wind chill factor also permanently affixed to or integral with the body.

2. An instrument according to claim 1 wherein said body member contains visual indication of useful information or data on the obverse side.

* * * * *